US010545900B2

United States Patent
Burns et al.

(10) Patent No.: US 10,545,900 B2
(45) Date of Patent: Jan. 28, 2020

(54) PHYSICAL CONFIGURATION OF A DEVICE FOR INTERACTION MODE SELECTION

(71) Applicant: Microsoft Technology Licensing, LLC, Redmond, WA (US)

(72) Inventors: Aaron Mackay Burns, Newcastle, WA (US); Riccardo Giraldi, Seattle, WA (US); Christian Klein, Duvall, WA (US); Roger Sebastian Kevin Sylvan, Seattle, WA (US); John Benjamin George Hesketh, Kirkland, WA (US); Scott G Wade, Calabasas, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 328 days.

(21) Appl. No.: 15/275,215

(22) Filed: Sep. 23, 2016

(65) Prior Publication Data

US 2018/0089131 A1    Mar. 29, 2018

(51) Int. Cl.
G06F 13/40    (2006.01)
G06F 9/445    (2018.01)

(52) U.S. Cl.
CPC ...... *G06F 13/4068* (2013.01); *G06F 9/44505* (2013.01)

(58) Field of Classification Search
CPC .................................................. G06F 13/4068
See application file for complete search history.

(56) References Cited

U.S. PATENT DOCUMENTS 8,606,293 B2    12/2013    Kim et al.
8,831,687 B1    9/2014    Kotab
(Continued)

FOREIGN PATENT DOCUMENTS

EP    2362292 A1    8/2011

OTHER PUBLICATIONS

Fitchard, Kevin, "PlaceMe's creator Alohar has a new app that tracks everything your family does", Published on: Jul. 23, 2014 Available at: https://gigaom.com/2014/07/23/placemes-creator-alohar-has-a-new-app-that-tracks-everything-your-family-does/.
(Continued)

*Primary Examiner* — Tammara R Peyton
(74) *Attorney, Agent, or Firm* — Alleman Hall Creasman & Tuttle LLP (57) ABSTRACT

In various embodiments, methods and systems are provide for detecting a physical configuration of a device based on sensor data from one or more configuration sensors. The physical configuration includes a position of a first display region of the device with respect to a second display region of the device, where the position is physically adjustable. A configuration profile is selected from a plurality of configuration profiles based on the detected physical configuration of the device. Each configuration profile is a representation of at least one respective physical configuration of the device. An interaction mode corresponding to the selected configuration profile is activated, where the interaction mode includes a set of mode input/output (I/O) features available while the interaction mode is active. Device interfaces of the device are managed using at least some mode I/O features in the set of mode I/O features based on the activating of the interaction mode.

21 Claims, 5 Drawing Sheets

(56) References Cited

U.S. PATENT DOCUMENTS

| | | | |
|---|---|---|---|
| 9,013,368 B1* | 4/2015 | Kim | G06F 3/1446 345/1.1 |
| 9,274,562 B2 | 3/2016 | Franklin et al. | |
| 9,329,679 B1 | 5/2016 | Shepard et al. | |
| 9,524,139 B2* | 12/2016 | Aurongzeb | G06F 3/04886 |
| 10,073,668 B2* | 9/2018 | Chun | G06F 3/1446 |
| 2008/0068291 A1 | 3/2008 | Yuan et al. | |
| 2008/0247128 A1 | 10/2008 | Khoo | |
| 2010/0112991 A1 | 5/2010 | Hannaby | |
| 2010/0304793 A1 | 12/2010 | Kim et al. | |
| 2012/0081400 A1* | 4/2012 | Schrock | G06F 1/1616 345/649 |
| 2013/0201099 A1* | 8/2013 | Guerin | G06F 3/005 345/156 |
| 2013/0205142 A1* | 8/2013 | Jung | G06F 1/1677 713/300 |
| 2014/0157125 A1* | 6/2014 | Seo | G06F 3/0488 715/716 |
| 2014/0320393 A1 | 10/2014 | Modarres et al. | |
| 2015/0220299 A1* | 8/2015 | Kim | G06F 3/0488 345/1.3 |
| 2015/0378395 A1 | 12/2015 | Manning | |
| 2016/0048170 A1* | 2/2016 | Kim | G06F 3/0414 345/173 |
| 2016/0050408 A1* | 2/2016 | Lee | H04N 5/247 348/47 |
| 2018/0061374 A1* | 3/2018 | Wygonik | G06F 1/1616 |

OTHER PUBLICATIONS

Smith, Chris, "Watch Samsung's rollable OLED smartphone display unfold before your eyes", Published on: May 25, 2016 Available at: http://bgr.com/2016/05/25/samsung-galaxy-x-foldable-smartphone/.

Dirks, Brent, "The iPhone 6s is listening for the 'Hey Siri' command, most of the time", Published on: Oct. 23, 2015 Available at: http://appadvice.com/appnn/2015/10/the-iphone-6s-is-listening-for-the-hey-siri-command-most-of-the-time.

* cited by examiner

PHYSICAL CONFIGURATION OF A DEVICE FOR INTERACTION MODE SELECTION

BACKGROUND

Computing devices are increasingly being equipped with automated personal assistant software. For example, APPLE® has developed a personal assistant referred to as "Siri," GOGGLE® has developed a personal assistant referred to as "Voice Actions" or "Google Now," MICROSOFT® has developed a personal assistant referred to as "Cortana," and AMAZON® has developed a personal assistant referred to as "Alexa." Typically personal assistants are optimized to interact with users on specific types of devices and in specific use cases. For example, a personal assistant accessed through a phone may be optimized differently than a personal assistant accessed through an environmental device, such as a living room device.

When a personal assistant, or other type of user agent, is used with a device in a way that it is not optimized for, the user experience can suffer, along with the performance of the user agent, and the device itself. For example, if a phone is placed away from a user in the environment, the personal assistant may be unable to interpret the user's speech when optimized for near-field speech recognition. Furthermore, the personal assistant may be unable to use features that take advantage of the device's place in the environment in order to better assist and interact with the user. Additionally, some active features could be unimportant or unwanted in certain user and/or environmental contexts, thereby wasting computing resources, such as power and computation.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the present disclosure relate to utilizing the physical configuration of a device to select an interaction mode for the device, such as for interaction with a user agent using the device. In doing so, features can be made available that are optimal for the particular physical configuration of the device.

In some implementations, interaction modes are selected based on the physical configuration of a device. An interaction mode includes a set of features available to manage device interfaces, such as displays, microphones, speakers, and other components while in the interaction mode. Different physical configurations of the device correspond to different interaction modes that have different sets of features. When the physical configuration of a device is detected, an appropriate interaction mode is activated for that configuration.

In some respects, the physical configuration of a device can include any combination of a physical relationship between the device and its environment (also referred to as a physical environmental configuration), and a physical relationship between portions of the device (also referred to as physical device configuration). An example of a physical environmental configuration is an orientation of a device with respect to its environment. An example of a physical device configuration is a position of one portion of a device with respect to another portion of the device.

In some respects, a device includes multiple display regions, such as multiple displays, where the position of the multiple display regions with respect to one another is adjustable. As one example, two displays can be connected by a hinge that allows an angle between the displays to be adjusted. As another example, a single display can be bendable to allow an angle between display regions to be adjusted. A new physical configuration of a device may be reached by adjusting the angle, and as a result, an active interaction mode for the device may be switched to an interaction mode corresponding to the new physical configuration. These and other concepts are contemplated as being within the scope of the present disclosure.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to utilizing the physical configuration of a device to select an interaction mode for the device, such as for user interaction with a user agent accessible through the device. In doing so, features can be made available that are optimal for the particular physical configuration of the device.

In some implementations, interaction modes are selected based on the physical configuration of a device. An interaction mode includes a set of features available to manage device interfaces, such as displays, microphones, speakers, and other components while in the interaction mode. Different physical configurations of the device correspond to different interaction modes that have different sets of features. When the physical configuration of a device is detected, an appropriate interaction mode is activated for that configuration.

In some respects, the physical configuration of a device can include any combination of a physical relationship between the device and its environment (also referred to as a physical environmental configuration), and a physical relationship between portions of the device (also referred to as physical device configuration). An example of a physical environmental configuration is an orientation of a device with respect to its environment. An example of a physical device configuration is a position of one portion of a device with respect to another portion of the device.

In some respects, a device includes multiple display regions, such as multiple displays, where the position of the multiple display regions with respect to one another is adjustable. As one example, two displays can be connected by a hinge that allows an angle between the displays to be adjusted. As another example, a single display can be bendable to allow an angle between display regions to be adjusted. A new physical configuration of a device may be reached by adjusting the angle, and as a result, an active interaction mode for the device may be switched to an interaction mode corresponding to the new physical configuration.

Figure 1:
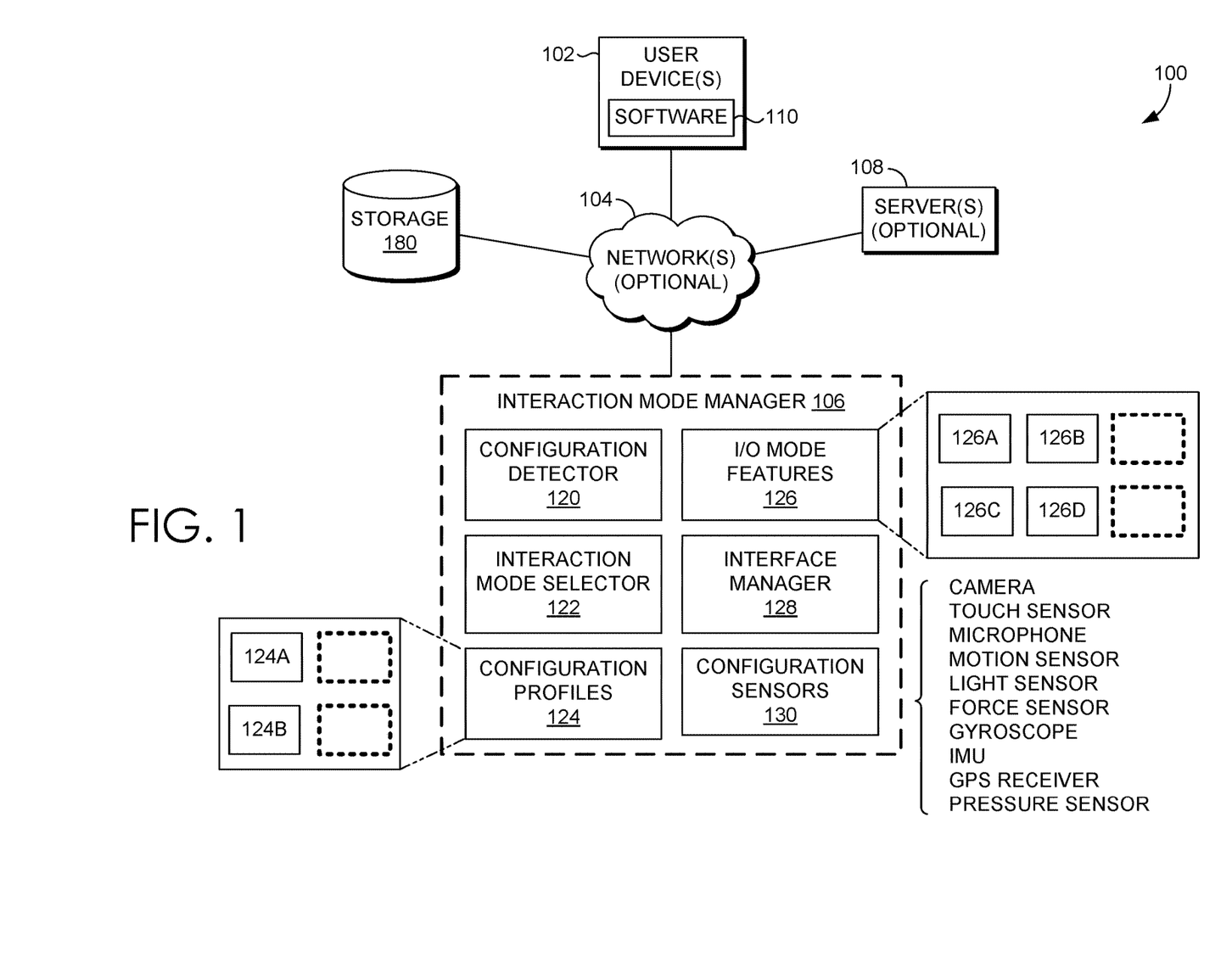
FIG. 1 shows a block diagram showing an example of an operating environment in accordance with embodiments of the present disclosure.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes user device 102, network 104, interaction mode manager 106, and server 108. Interaction mode manager 106 includes configuration detector 120, interaction mode selector 122, configuration profiles 124, interface manager 128, and configuration sensors 130.

It is noted that although depicted separately, in some embodiments, all of the functionality of operating environment 100 is integrated into user device 102. Thus, for example, storage 180 and interaction mode manager 106 may be in user device 102. Server 108 and network 104 may not be required for these embodiments. However, in other cases, some of the functionality of operating environment 100 is external to user device 102, such as some of the functionality of interaction mode manager 106.

Thus, it should be understood that operating environment 100 shown in FIG. 1 is an example of one suitable operating environment. Each of the components shown in FIG. 1 may be implemented via any type of computing device, such as one or more of computing device 600, described in connection to FIG. 6, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data stores may be employed within operating environment 100 within the scope of the present disclosure. Each may comprise a single device or multiple devices cooperating in a distributed environment. For instance, one or more of the constituents of interaction mode manager 106 may be provided via multiple devices arranged in a distributed environment that collectively provide the functionality described herein. Additionally, other components not shown may also be included within the distributed environment.

In some embodiments, one to all of the functionality of interaction mode manager 106 can be integrated, at least partially, into a user device, such as user device 102. In some embodiments, operating environment 100 does not require network 104. For example, storage 180 and interaction mode manager 106 could be completely integrated into user device 102. In other cases, interaction mode manager 106 may at least partially be a cloud computing service (e.g., integrated into server 108).

Storage 180 can store any data utilized by interaction mode manager 106 and/or software 110 and may be at least partially located on user device 102 and/or server 108. The data can include sensor readings, configuration profiles, mode I/O features, settings, device configurations, and the like, any of which may be persistently stored on storage 180 for use by the various components of operating environment 100.

User device 102 can be a client device on a client-side of operating environment 100, while server 108 can be on a server-side of operating environment 100. When implemented using server 108, interaction mode manager 106 can comprise server-side software designed to work in conjunction with client-side software on user device 102 so as to implement any combination of the features and functionalities discussed in the present disclosure. An example of such client-side software is software 110 on user device 102. As used herein, software 110 broadly includes one or more of any combination of an operating system, a system service, an application (e.g., installed on an operating system of the device), firmware, a device driver, and the like. When implemented without using server 108, similar functionality as server 108 may be achieved locally by software 110.

In implementations where a digital agent is employed, software 110 can correspond to the digital agent. Further the digital agent can be implemented using any combination of client-side and/or server-side software. Where passive listening is employed by the digital agent, in some cases the client-side software performs passive listening by processing audio from one or more users. In some cases, the client-side software further determines whether to enter into an active listening mode based on the processing of the audio, such as by identifying a "wake up" command from the audio. In the active listening mode, the client-side software may optionally provide audio received during the active listening mode to server-side software for processing.

Further the server-side software may provide one or more instructions to the client-side software in response to the processing.

User device 102 comprises any type of computing device capable of being operated by a user. In some implementations, user device 102 is the type of computing device described in relation to FIG. 6 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device includes one or more processors, and one or more computer-readable media. The computer-readable media includes computer-readable instructions executable by the one or more processors. The instructions may be embodied by one or more software modules, such as software 110 shown in FIG. 1. Software 110 is referred to in singular form for simplicity, but its functionality can be embodied by one or more software modules in practice. As indicated above, in some cases, the software is embodied collectively by user device 102 and server 108 (and/or optionally other devices).

Interaction mode manager 106 includes configuration detector 120, which is configured to detect whether a device, such as user device 102 is in a physical configuration and/or determine a current physical configuration of the device. As used herein, a physical configuration of a device includes at least one physical relationship that must be satisfied for the device to be in the physical configuration. A physical configuration of a device can include any combination of a physical relationship between the device and its environment (also referred to as a physical environmental configuration), and a physical relationship between portions of the device (also referred to as physical device configuration).

Figure 2A:
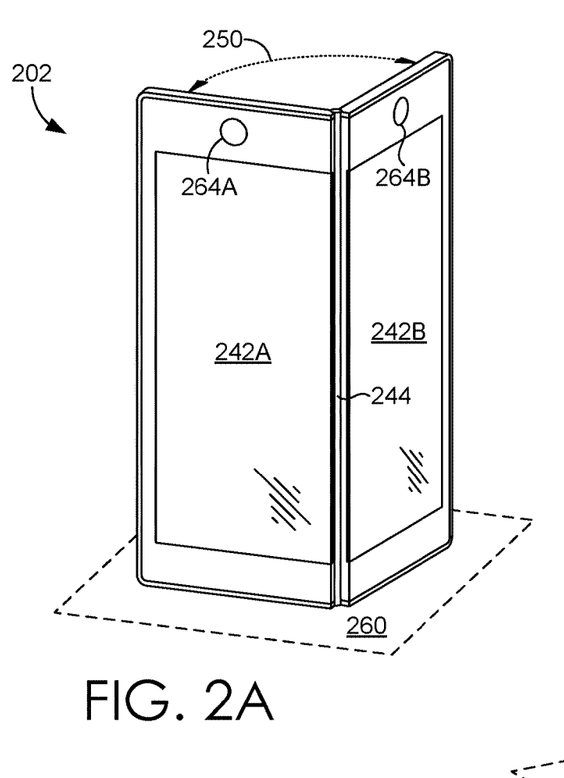
FIG. 2A shows a device in a physical configuration in accordance with embodiments of the present disclosure.
Figure 2B:
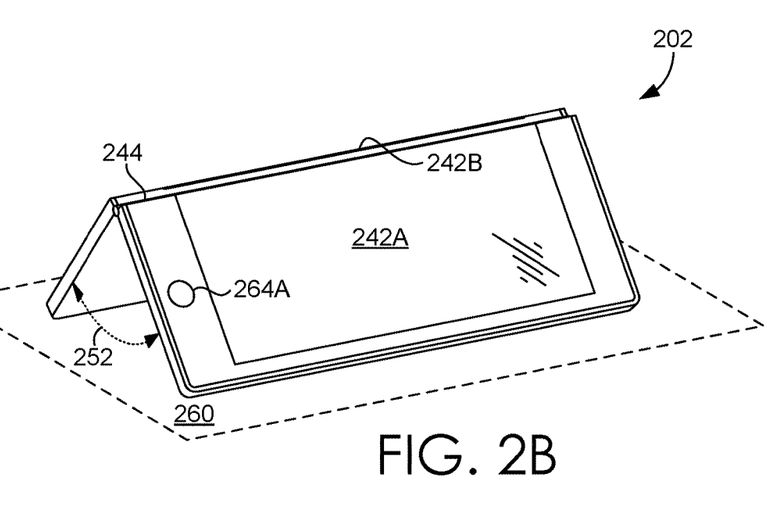
FIG. 2B shows a device in a physical configuration in accordance with embodiments of the present disclosure.
Figure 3A:
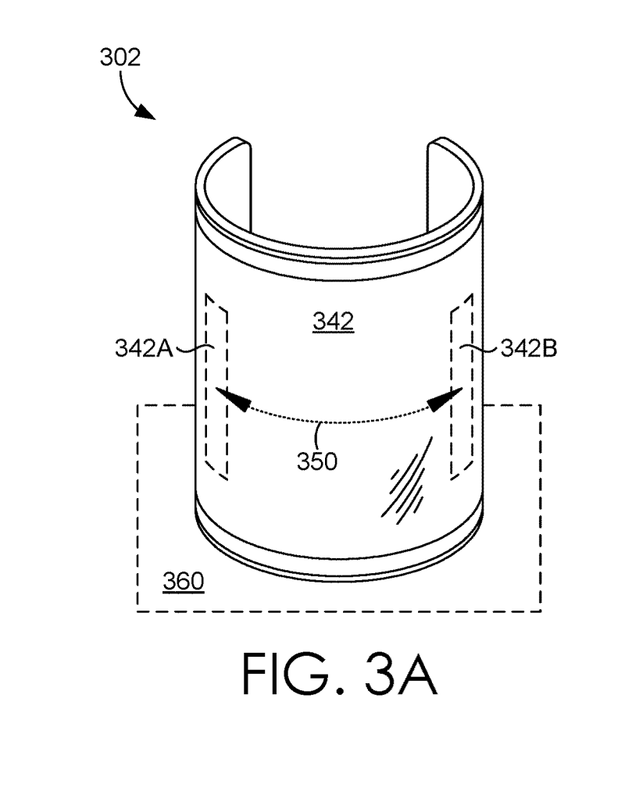
FIG. 3A shows a device in a physical configuration in accordance with embodiments of the present disclosure.
Figure 3B:
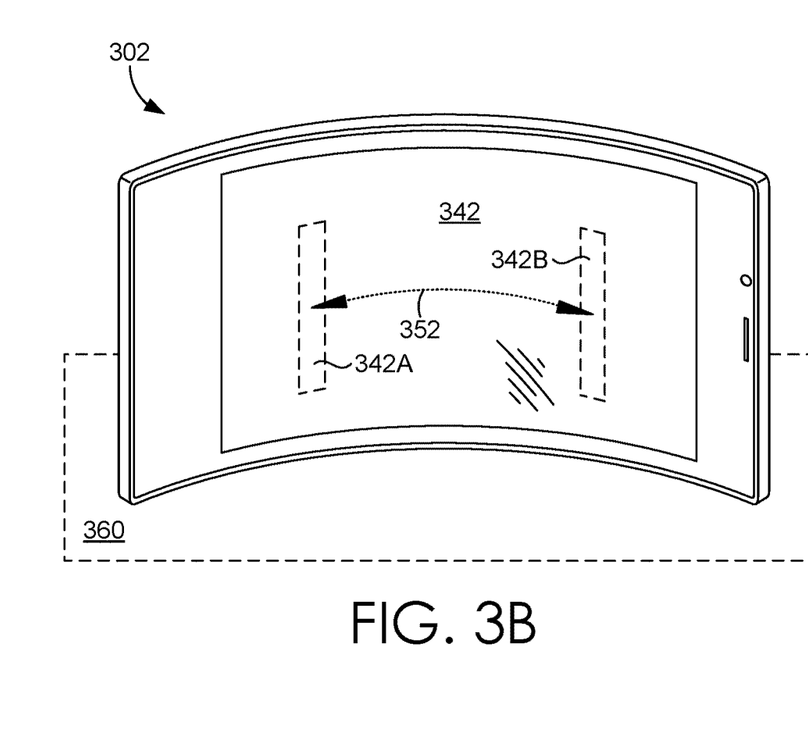
FIG. 3B shows a device in a physical configuration in accordance with embodiments of the present disclosure.

FIG. 2A shows an example of device 202 in one physical configuration and FIG. 2B shows an example of device 202 in another physical configuration. Similarity, FIG. 3A shows an example of device 302 in one physical configuration and FIG. 3B shows an example of device 302 in another physical configuration. Each of the physical configurations shown can be detected by interaction mode manager 106. Further device 202 and device 302 are different examples of user device 102 of FIG. 1.

The physical configurations shown in FIGS. 2A, 2B, 3A, and 3B each comprise a physical device configuration. In the examples shown, each physical configuration corresponds to a physical relationship between display regions of the corresponding device, and in particular, a position of a first display region of the device with respect to a second display region of the device. In FIGS. 2A and 2B, the display regions correspond to respective displays of device 202. For example, one display region may correspond to display 242A and another display region may correspond to display 242B. The physical relationship between those display regions can correspond to angle 250 between the displays in FIG. 2A and angle 252 between the displays in FIG. 2B.

In contrast to FIGS. 2A and 2B, FIGS. 3A and 3B show a physical relationship between display regions located on a common display of a device. For example, the physical configuration of FIG. 3A corresponds to angle 350 between display regions 342A and 342B, which both correspond to display 342. Similarly, the physical configuration of FIG. 3B corresponds to angle 352 between display regions 342A and 342B, which both correspond to display 342.

Each of devices 202 and 302 are designed to be physically manipulated, such as by a person, in order to adjust the physical configuration of the device. Thus, the device may be manipulated into and out of the physical configurations shown. In the present examples, the physical manipulation comprises bending the device. Device 202, for example, is a bendable device comprising hinge 244, which can be manipulated to adjust the position (e.g., angle and/or distance) between displays 242A and 242B. Any suitable type of hinge or joint can be employed such as a discrete hinge or one integrated into a display or other portion of device 202.

In the example shown, hinge 244 is fully articulating, allowing device 202 to be adjusted from fully closed position, in which displays 242A and 242B are facing one another and unviewable to a user, to a fully open position, in which displays 242A and 242B are opposing one another, and exposed for viewing. Each achievable configuration of the device corresponds to a respective physical configuration of the device.

Similar to device 202, device 302 is also a bendable device. Device 302 comprises bendable display 342, which can be manipulated to adjust the position (e.g., angle and/or distance) between display regions 342A and 342B. Any suitable bendable display can be employed. Further, in some cases, display 342 can be bent in different manners than what is shown, including about other axes. The physical configuration of FIG. 3A may vary from FIG. 3B in that device 302 is bent in an inverted manner from FIG. 3A to FIG. 3B.

It should be appreciated that in various implementations, the form of devices as well as the physical device configurations available for the devices can vary widely while still being within the scope of the present disclosure. Further, the means for achieving the physical device configurations can also vary widely from the examples of a hinge and bendable display shown. As an additional example, a composite or unitary device could comprise two or more segments, which can be detached, separated, repositioned, and/or reattached by the user in order to achieve corresponding physical device configurations.

The physical configurations of devices of FIGS. 2A, 2B, 3A, and 3B also include physical environmental configurations. In FIGS. 2A and 2B, angles 250 and 252 may be substantially similar, as an example, so that device 202 is in the same physical device configuration in both FIGS. 2A and 2B; however, they may correspond to different physical configurations of device 202 because they have different physical environmental configurations. In particular, the orientation of device 202 with respect to its environment varies between FIGS. 2A and 2B. In FIG. 2A, the physical configuration of device 202 may be referred to as a "brochure" posture and the physical configuration of device 202 in FIG. 2B may be referred to as an "easel" or "tent" posture.

In the physical configuration of FIG. 2A, an edge of device 202 is situated on support surface 260. The edge is bisected by an axis about which device 202 can be bent (e.g., corresponding to hinge 244). Further, in this example, device 202 comprises two minor edges and two major edges, where a minor edge is in contact with support surface 260. In the present example, angle 250 allows device 202 to be fully supported on support surface 260 by the panels comprising displays 242A and 242B at the edge to remain in the configuration as shown.

In the physical configuration of FIG. 2B, two edges of device 202 are situated on support surface 260. In this example, device 202 comprises the two minor edges of device 202 are in contact with support surface 260. Device 202 is fully supported on support surface 260 on the two edges to remain in the configuration as shown. Such support may be provided, for example, at least partially by hinge 244. For example, hinge 244 may have sufficient friction that prevents device 202 from changing its physical device configuration (e.g., prevents angle 252 from changing).

In both FIGS. 3A and 3B, device 302 has the same orientation with respect to support surface 360. In other cases, device 302 could be supported by two edges, similar to device 202 in FIG. 2B, supported by at least a minor edge, or take on another potential physical posture or configuration.

In should be appreciated that the physical environmental configurations shown are merely exemplary. Further, in various implementations, a device may include any suitable support structure, such as one or more stands, to support a physical environmental configuration. Further, it is contemplated that a physical environmental configuration does not require a support surface and could generally correspond to a position of a device in three dimensional space.

It is further noted that the devices shown are unitary devices. However, in other cases, device 202, for example, could be a composite device. For example, display 242A could be on one device and display 242B could be on another device. The devices may be coupled together and in some cases completely severable. For example, two separate devices may be connectable to achieve a composite device. For the purposes of the present disclosure, the term "device" refers to a composite device or a unitary device (i.e., a non-composite device).

As an overview, configuration detector 120 can detect a physical configuration of a device based on sensor data from configuration sensors 130. Configuration detector 120 selects a configuration profile representing the detected physical configuration, where the configuration profile defines an interaction mode for the device. Interaction mode selector 122 activates the interaction mode corresponding to the detected configuration profile. The interaction mode represents one or more mode Input/Output (I/O) features of mode I/O features 126 of the device. Activating the interaction mode ensures the corresponding mode I/O features are available to interface manager 128, which manages device interfaces of the device using available mode I/O features. Activating the interaction mode may activate one or more mode I/O features of the interaction mode and/or deactivate one or more mode I/O features based on those features not being included in the interaction mode. Activating a mode I/O feature can include activating a computing process and/or hardware corresponding to the mode I/O feature. For example, available features can be switched from those included in an interaction mode corresponding to a previous physical configuration of the device to those included in the interaction mode for the current physical configuration of the device. Thus, the device can be physically manipulated to switch between or set interaction modes.

Configuration detector 120 can detect physical configurations using sensor data from at least one configuration sensor, such as any combination of configuration sensors 130. Each of configuration sensors 130 correspond to a physical sensor component of a device, such as user device 102. Configuration detector 120 can determine whether user device 102 is in a physical configuration based on at least one signal from the physical sensor component. Examples of configuration sensors that configuration detector 120 can use to detect a physical configuration of user device 102 include one or more of any combination of a camera, a touch sensor, a microphone, a motion sensor, a light sensor, a force sensor, a gyroscope, an Internal Measurement Unit (IMU), a Global Positioning System (GPS) receiver, a pressure sensors, and many more.

As one specific example, configuration detector 120 may detect that device 202 is in the physical configuration shown using one or more pressure sensors on the edge of device 202 in contact with support surface 260 in FIG. 2A to detect the physical environmental configuration and an IMU integrated into hinge 244 to detect the physical device configuration. The physical device configuration of FIG. 2B could similarly be detected and the physical environmental configuration could be detected using one or more pressure sensors on at least one of the edges of device 202 in contact with support surface 260 in FIG. 2B.

It should be appreciated that many approaches exist for detecting the physical device configuration and/or physical environmental configuration of a device. As another example, one or more of cameras 264A and 264B and/or gyroscopes of device 202 could be used to detect the physical configuration of device 202. Further, device 202 may lock into one or more discrete positions, which when achieved provides a signal to configuration sensors 130 to indicate the physical configuration. In one example, the minor edges of device 302 could snap or lock together indicating a physical configuration in which device 302 (e.g., display 342) forms a continuous loop. In some cases, configuration detector 120 explicitly detects a physical configuration from one or more configuration sensors. However, configuration detector 120 may infer a physical configuration from any combination of sensor data along with other information available to the device. As one example, the physical configuration of FIG. 2A could be inferred, at least partially based on configuration detector 120 determining device 202 has not moved for a predetermined amount of time (e.g., using motion sensors, gyros, and/or cameras). As another example, the physical configuration of FIG. 2A could be inferred, at least partially based on configuration detector 120 determining device 202 has not been touched for a predetermined amount of time (e.g., using touch sensors).

Each physical configuration detected by interaction mode manager 106 can correspond to one of configuration profiles 124. Configuration profiles 124 include configuration profiles, examples of which include configuration profiles 124A and 124B. Each configuration profile represents one or more physical configurations of a device. For example configuration profile 124A represents at least the physical configuration of device 202 in FIG. 2A and configuration profile 124A represents at least the physical configuration of device 202 in FIG. 2B. It is noted that in the present example, a single physical configuration is represented by a single configuration profile. However, a single configuration profile can represent multiple physical configurations. For example, configuration profile 124A could represent device 202 through a range of values for angle 250. Configuration profile 124A could also exclude one or more ranges of values for angle 250, particularly in cases where configuration detector 120 can utilize measurements of angle 250 from one or more configuration sensors.

Each example of a physical configuration described herein could be represented by a respective configuration profile or combined into one or more configuration profiles with another physical configuration. Thus, the physical configurations in both FIGS. 3A and 3B could correspond to the same configuration profile, or could correspond to separate configuration profiles. In various embodiments, configuration detector 120 is capable of detecting physical configurations sufficiently (e.g., with sufficiently granularity) to select or identify at most a single configuration profile from configuration profiles 124A that represents the current physical configuration of the device. In doing so, configuration detector 120 may be capable of distinguishing between each physical configuration represented by a configuration profile.

Each configuration profile defines an interaction mode for the one or more physical configurations represented by the profile. An interaction mode represents a set of mode I/O features, which includes at least one mode I/O feature. In the present example, the set of mode I/O features are a subset of mode I/O features 126. Each configuration profile can correspond to a different set of mode I/O features. For example, configuration profile 124A can comprise mode I/O features 126A, 126B, and 126C and configuration profile 124B can comprise mode I/O features 126B and 126D. Any number of mode I/O features may be included in a set of mode I/O features for an interaction mode.

The set of mode I/O features for an interaction mode of a configuration profile represents a set of mode I/O features available to interface manager 128 while the device is in a physical configuration of a configuration profile detected by configuration detector 120. A mode I/O feature represents one or more functions that use data from or provides data to at least one input or output component of the device. Using configuration profiles, the mode I/O features available in physical configurations can be set such that they are optimal for the physical and/or environmental characteristics of the device as well as expected use cases.

In some implementations, each configuration profile is predefined for physical configurations with corresponding mode I/O features. However, at least some configuration profiles and/or mode I/O features for associated interaction modes can be generated at any time. For example, mode I/O features could be generated using associated rules that operate based on sensor data from configuration sensors 130 and/or other contextual data available to configuration detector 120. For example, configuration detector 120 could generate configuration profiles based on device information that defines device I/O features the device is capable of including hardware profiles, installed drivers, and the like. In some cases, configuration detector 120 selects one or more pre-generated configuration profiles to be available for selection/detection based on any combination of the aforementioned information. For example, some configuration profiles may be suitable for some devices and not others. As another example a peripheral could be attached to a device or the device could be upgraded with hardware or software and the configuration profiles could be updated and/or new configuration profiles could be added to available configuration profiles. It should also be appreciated that in some embodiments, mode I/O features for pre-generated configuration profiles could be added to or removed from the configuration profiles based on any combination of the aforementioned information.

Having activated an interaction mode, interface manager 128 can manage device interfaces of the device using at least some features in the set of features based on the activating of the interaction mode. Mode I/O features may be made available at any suitable level of abstraction. One or more of the mode I/O features may be part of the operating system and/or firmware of the device (e.g., accessible by apps using an API). As another example, one or more of the mode I/O features may be part of one or more applications, services, drivers, or other software that are not part of the operating system. An available mode I/O feature may be invoked by one or more designated applications or services, or made available globally. In some cases, a mode I/O feature becomes available by activating the mode I/O feature, which may include launching, waking, and/or enabling a service that performs one or more functions of the mode I/O feature.

Although a set of features of an interaction mode may be available, not all of the mode I/O features may be employed. For example, mode I/O features may be used as needed, or as invoked, during an interaction session with one or more users. However, one or more conditions for invoking a mode I/O feature may not occur during a particular interaction session (e.g., based on device inputs such as from the user and/or software that facilitates the interaction session).

In some cases, in response to detecting a physical configuration and selecting a corresponding configuration profile, the interaction mode is automatically activated for the device. In other cases, the user is presented with a prompt, such as an option to activate the interaction mode. A prompt could be used, for example, based on a level of confidence configuration detector 120 calculates on the device in a physical configuration corresponding to the configuration profile. Where the level of confidence is exceeded, the interaction mode could automatically be activated. This approach may be especially suitable for inference based determinations of physical configurations.

In some implementations, activating an interaction mode automatically deactivates one or more mode I/O features. For example, a configuration profile could include a list of mode I/O features to exclude from availability while its corresponding interaction mode is active (e.g., while the device is in the corresponding physical configuration). In addition, or instead, activating an interaction mode may automatically deactivate a currently active interaction mode (e.g., of a configuration profile). This may include deactivating any of mode I/O features 126 that are not included in the newly activated interaction mode. Thus, interaction mode selector 122 can actively switch between interaction modes as the physical configuration of the device changes and configuration detector 120 detects those changes (e.g., in real-time or near real-time). It is noted in some cases, an interaction mode could become active when no interaction mode was previously active. As one example, manipulating a device into a defined physical configuration could activate an interaction mode.

Activating a mode I/O feature can correspond to activating a physical component of the device (e.g., switching a component on or waking it from sleep or hibernation, which increases power draw for the component), such as one or more cameras, speakers, microphones, displays, or any combination thereof on the device, or activating functionality corresponding to any of those devices. Similarly, deactivating a mode I/O feature can correspond to deactivating a physical component of the device, such as one or more cameras, speakers, microphones, displays, or any combination thereof on the device, or deactivating functionality corresponding to any of those devices.

An example of a mode I/O feature includes ambient or passive listening, such as for a user agent, which could be a user assistant like a personal or group assistant. While ambient or passive listening is active, interface manager 128 utilizes one or more microphones of user device 102 to, for example, detect a verbal prompt or other audible cue or speech input from a user, such as an activation word, phrase, or other activation prompt. Using implementations of the present disclosure, while device 202 is in either of the positions shown, a configuration profile could allow for ambient or passive listening to be active. However, in a different physical configuration of device 202, ambient or passive listening may be inactive (or deactivated based on the physical configuration). In one example, the physical configuration could be when displays 242A and 242B are facing one another, such as when the device is in a fully closed position. In addition, or instead, a suitable physical configuration could be when displays 242A and 242B are opposing one another, such as when the device is in a fully opened position.

By activating and/or deactivating mode I/O features based on physical configurations of the device, computing resources can be preserved such as by deactivating mode I/O features that are unneeded or unimportant for expected use cases of the device in certain configurations. For example, passive or ambient listening can be power intensive and therefore disabling such functionality preserves power.

As another example, one or more mode I/O features can correspond to a privacy level or setting. The privacy level or setting could dictate what content is or is not displayed on one or more of displays 242A and 242B, or otherwise output via devices interfaces (e.g., audible content over a speaker). When a privacy level of device 202 is increased by a physical configuration of the device, for example, text messages, instant messages, emails and/or other user notifications may not be displayed on display and/or audibly indicated on device 202. This may be suitable for the physical configurations shown in FIGS. 2A and 2B, where the device may be part of a group meeting or expected use case that involves at least one user in addition to or instead of a primary user of the device (e.g. a primary user could be a user currently logged into the operating system, an owner of the device, a user associated with a personal mode of the device, and/or a user identified by a specific user profile).

One or more mode I/O features can also correspond to a camera operation setting for the device. As one example, device 202 may switch from dual or multi camera setting to independent camera setting based on a physical configuration of the device. For example, in the physical configuration of FIG. 2A, the device may be in multi camera setting, where interface manager 128 operates cameras 264A and 264B in conjunction to interpret environmental data. This could include 3-D reconstructions of the environment, such as to track locations of users and/or objects in the environment. In the physical configuration of FIG. 2B, the device may instead be in independent camera setting, where interface manager 128 operates at least one of cameras 264A and 264B independently to interpret environmental data. This could include 2-D tracking or other environmental capture and/or interpretation. As an example, in the physical configuration of FIG. 2B it may be expected that each camera is able to capture substantially independent views of the environment. Thus, a user visible to camera 264A might not be visible to camera 264B. In contrast, in the physical configuration of FIG. 2A, the view of each camera may substantially overlap, particularly where the device is in the corner of a room or another location with high visibility of the environment.

One or more mode I/O features can also correspond to a display operation setting for the device. Similar to the example above, device 202 may switch from a dual or multi display setting to an independent display setting based on a physical configuration of the device. In a multi display setting, interface manager 128 operates at least two displays of the device as a single display. For example, displays 242A and 242B may be operated as a single display in FIG. 2A under the assumption that a user can typically view both displays concurrently. In an independent display setting, interface manager 128 operates multiple displays and/or display regions of the same display as separate displays. For example, in FIG. 2B, displays 242A and 242B may be operated independently under the assumption that a user can typically view only one of the displays at a time. For example, each display or display region may be facing a particular user and the content displayed thereon may be based on the particular user being able to view the corresponding display. Further, the content might move from one display or region to another as the user moves around the environment. For example, device 202 could track a user around the environment comprising the device and modify the display(s) or region(s) as the user moves around (e.g., determining a position and/or direction of the user and updating the display accordingly). This can be done to ensure the content remains visible to the user.

In one implementation, the independent display setting is used for the physical configuration of FIG. 2B to translate user speech. A first user facing camera 264B may provide speech input to device 202. Optionally, the speech may be converted into text in the user's language and displayed on display 242B. The speech can also be automatically translated into another language including converting the speech into text of the other language and displayed on display 242A for viewing by another user.

In some examples, each display displays at least some of the same content. For example, because each user may be unable to fully view a particular region of the display, the content may be redundantly displayed so it is viewable from more locations in the environment.

Other examples of display operation settings include content display size settings. For example, the same content may be displayed larger in some physical configurations than in others on the device. As an example, it may be presumed that when device 202 is fully opened it will be used up close by a single user and therefore font, graphics, and the like may be smaller than in the physical configurations of FIGS. 2A and 2B. In addition to content display size, content display location can be set by a mode I/O feature including a display region on a display and/or which display to display the content.

Other examples of display operation settings include content display orientation settings. For example, in the configuration of FIG. 2A a portrait orientation could be used and in the configuration of FIG. 2B a landscape configuration could be used for the entire display(s), regions thereof, and/or particular items of content thereof.

One or more mode I/O features can also correspond to a microphone operation setting for the device. Similar to the example above, device 202 may switch from dual or multi microphone setting to an independent microphone setting based on a physical configuration of the device. In a multi microphone setting, interface manager 128 operates one or more microphones of the device collaboratively. For example, an array of microphones could be along an edge of device 202 (e.g., the top edge proximate to cameras 264A and 264B and possibly on each panel of the device). In an independent display setting, interface manager 128 operates the microphones independently. For example, in a multi microphone setting, interface manager 128 may use multiple microphones in conjunction to reduce interference between users who are speaking or otherwise better pinpoint locations of sounds in the environment.

In some respects, based on the physical configuration of the device, interface manager 128 may switch between a near field interaction mode and far field interaction mode. The near field interaction mode is optimized for interacting with users proximate to the device, whereas the fair field mode is optimized for interacting with users non-proximate to the device. A near field interaction mode could comprise a smaller content display size setting, a lower volume setting, enabled or optimized touch input control, a near field speech model, an independent microphone mode, and the like, in contrast to a far field interaction mode.

In some respects, based on the physical configuration of the device, interface manager 128 may switch between user interaction settings of the device. This can include switching from group interaction setting to personal interaction setting, or between different types of group interaction settings. As used herein, a user interaction setting is defined by at least one user. In a personal interaction setting, the user is typically the primary user of the device and/or the user currently logged into the device. A group interaction setting is defined by multiple users. Group interaction settings may optionally be customized for interaction with one or more particular users. In some cases, user interaction settings are based on determining environmental characteristics of the device, such as based on optionally detecting at least one to all of the users in the environment (e.g., using environmental data captured from the environment by the device) or otherwise inferring their presence. Thus, the appropriate settings may be applied in the interaction mode based on detecting corresponding environmental characteristics (which could change and be updated accordingly).

In some cases, one group interaction setting is a family interaction setting and includes mode I/O features optimized for a family. Another group interaction setting may be a meeting interaction setting and include mode I/O features optimized for colleagues, clients, business associates, and the like. It is noted that individual users for user interaction settings may be predefined and have corresponding user profiles and/or settings for one or more interaction settings that could be enforced when the user is present. However, user interaction settings need not be explicitly defined and the presence of particular users or system defined users not be required.

In some cases, switching from a personal interaction setting to a group interaction setting increases the privacy level and/or activates privacy settings for device interfaces of the device. In particular each user interaction setting could have corresponding privacy settings or levels, as described above. These settings can impact the content that is displayed on the device. Further, these settings may impact which users are able to control the device or otherwise interact with the device in one or more defined ways (e.g., audibly). For example, in family mode, only members of a particular group of users may be capable of invoking particular operations on the device, in personal mode, only a single user may be capable of invoking those operations, and in meeting mode, any user may be capable of invoking the operations, as some examples. These operations could correspond to user agent operations, such as speech commands, speech-based inferences, and the like.

Figure 4:
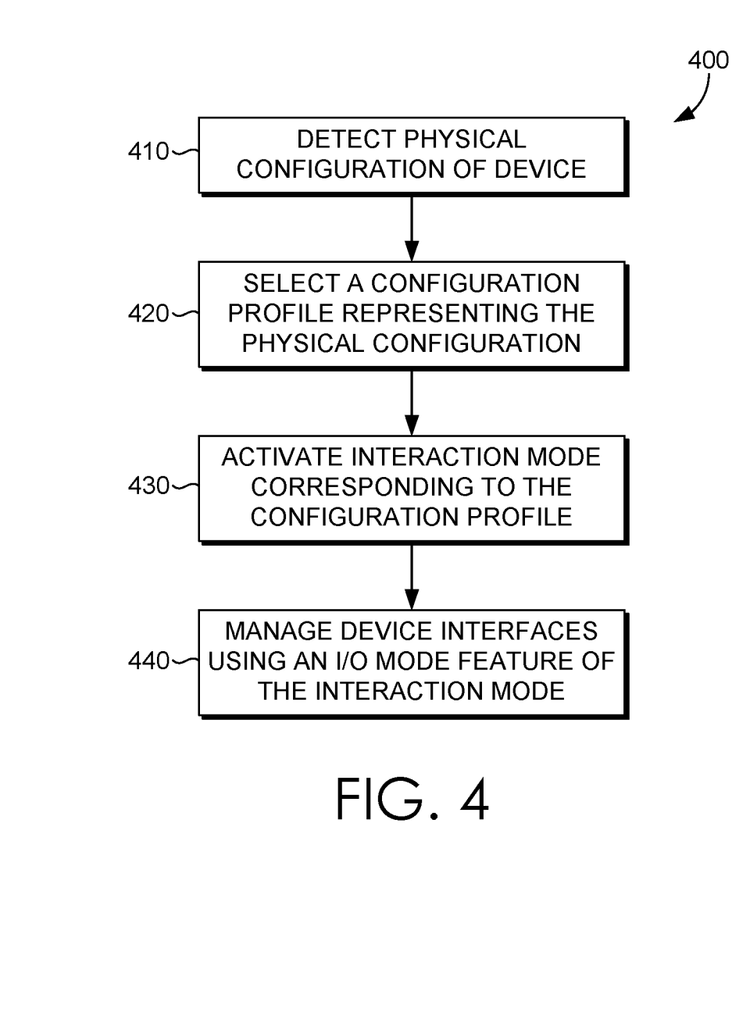
FIG. 4 is a flow diagram showing a method in accordance with embodiments of the present disclosure.

Referring now to FIG. 4, a flow diagram is provided showing one embodiment of a method 400 for selecting an interaction mode for a device. At block 410, method 400 includes detecting a physical configuration of a device. For example, configuration detector 120 can detect the physical configuration of device 202 shown in FIG. 2A based on sensor data from configuration sensors 130. The physical configuration can comprise a position of display 242A with respect to display 242B, where the position is physically adjustable. For example, a person could manipulate device 202 to change angle 250 thereby adjusting the position. Configuration detector 120 may detect the physical configuration based on or in response to such a manipulation or adjustment to the position. In some cases, configuration detector 120 determines or calculates the position from the sensor data (e.g., from a sensor's physical measurements). The physical configuration could also comprise the orientation of the device with respect to support surface 260 and this aspect of the physical configuration could be detected from sensor data.

At block 420, method 400 includes selecting a configuration profile representing the physical configuration. For example, configuration detector 120 may select configuration profile 124A, which represents the physical configuration. This can include mapping the sensor data to the configuration profile.

At block 430, method 400 includes activating an interaction mode corresponding to the configuration profile. For example, interaction mode selector 122 may automatically activate the interaction mode represented by the configuration profile. This could include switching from one interaction mode to another, and disabling/enabling various mode I/O features to make available the mode I/O features of the interaction mode.

At block 440, method 400 includes managing device interfaces using a feature of the interaction mode. For example, interface manager 128 can utilize available mode I/O features, such as to facilitate interaction with one or more users of the device. This can include receiving and/or sending API or device calls to one or more components of the device in accordance with the mode I/O features. For example interface manager 128 may interface with software or services installed on the device. This can include software 110 of FIG. 1. In some cases, interface manager 128 is at least partially integrated into software 110 and/or one or more software modules thereof.

Figure 5:
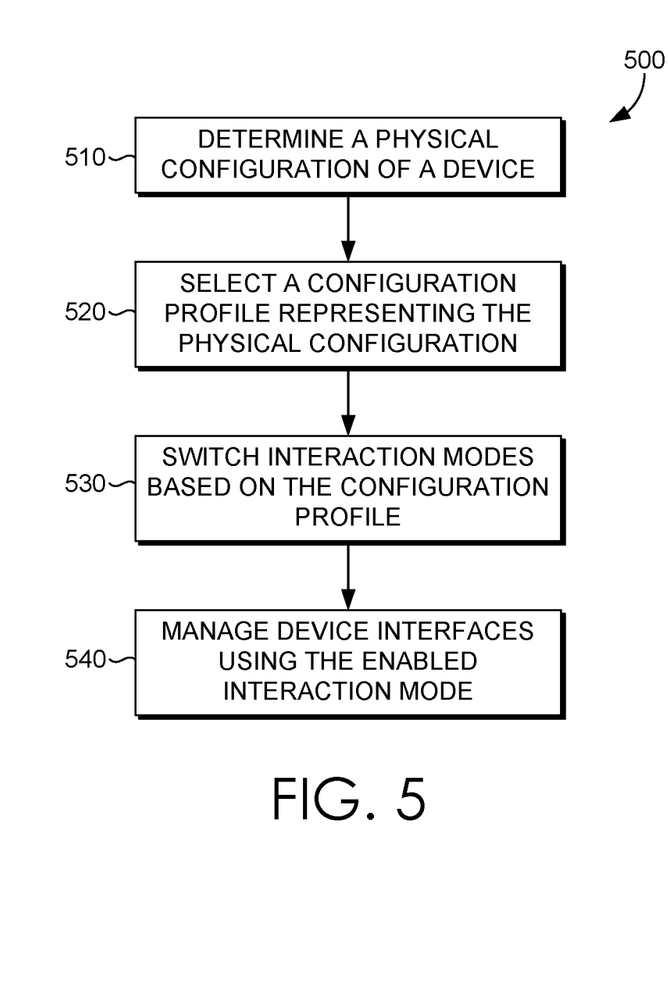
FIG. 5 is a flow diagram showing a method in accordance with embodiments of the present disclosure.

Referring now to FIG. 5, a flow diagram is provided showing one embodiment of a method 500 for selecting an interaction mode for a device. At block 510, method 500 includes determining a physical configuration of a device. For example, configuration detector 120 can determine that device 202 is in a physical configuration corresponding to FIG. 2B. This could be determined in response to data from device sensors, such as motion sensors. For example, a user could pick up device 202 from the physical configuration of FIG. 2A, and device sensors could provide readings that activate configuration detector 120, as an example. Subsequently, configuration detector 120 may determine device 202 is in physical configuration shown in FIG. 2B. In some cases, the position of the display(s) and/or regions thereof were initially determined by configuration detector 120 for determining the physical configuration of FIG. 2A. Based on an absence of sensor data corresponding to the position (e.g., from an IMU), configuration detector 120 may infer device 202 has remained in the same physical device configuration. Thus, configuration detector 120 may refrain from polling one or more sensors associated with detecting the physical device configuration and/or need not process data from the sensors to detect the new physical configuration.

At block 520, method 500 includes selecting a configuration profile representing the physical configuration. For example, configuration detector 120 may select configuration profile 124B.

At block 530, method 500 includes switching interaction modes based on the configuration profile. For example, interaction mode selector 122 can switch or transition from an interaction mode corresponding to configuration profile 124A and the physical configuration of FIG. 2A to the new interaction mode based on detecting the new physical configuration of device 202. One or more mode I/O features may be switched on or otherwise activated and/or switched off or otherwise deactivated so as to ensure the mode I/O features of the new interaction mode are available to interface manager 128.

At block 540, method 500 includes managing device interface using the enabled interaction mode. For example, interface manager 128 can manage device interfaces of device 202 using the mode I/O features of the activated interaction mode.

Figure 6:
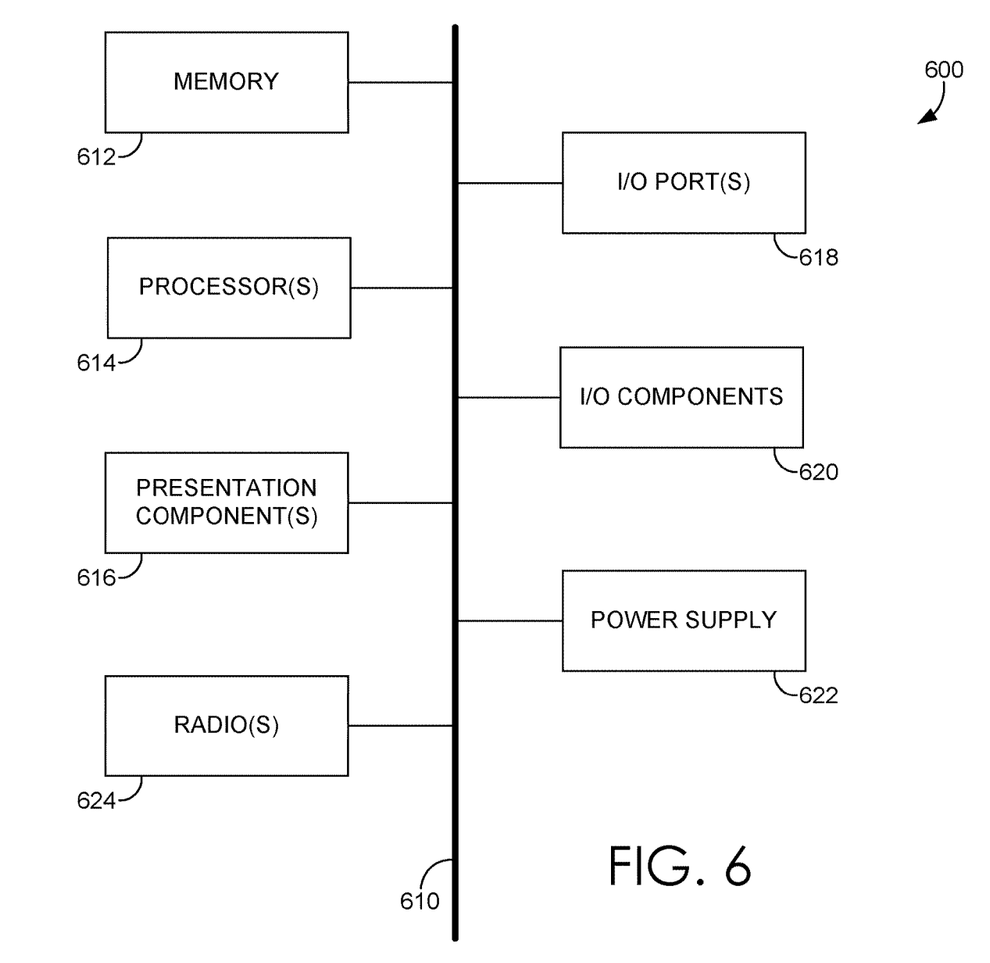
FIG. 6 is a block diagram of an exemplary computing environment suitable for use in implementations of the present disclosure.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
   detecting a physical configuration of a device based on sensor data from one or more configuration sensors, the physical configuration comprising a position of a first display region of the device with respect to a second display region of the device, wherein the position is physically adjustable;

selecting a configuration profile from a plurality of configuration profiles based on the detected physical configuration of the device, each configuration profile being a representation of at least one respective physical configuration of the device;

activating an interaction mode corresponding to the selected configuration profile, the interaction mode comprising a set of mode input/output (I/O) features available while the interaction mode is active; and managing device interfaces including one or more microphones of the device using at least some mode I/O features in the set of mode I/O features based on the activating of the interaction mode, where such managing causes the one or more microphones to operate differently for a first physical configuration of the device relative to a second physical configuration of the device.

2. The method of claim 1, wherein the first display region is of a first display of the device and the second display region is of a second display of the device.

3. The method of claim 1, wherein the detecting of the physical configuration comprises detecting a physical orientation of the device.

4. The method of claim 1, wherein the first display region and the second display region are coupled together by a hinge that is configured to bend to adjust the position.

5. The method of claim 1, wherein the first display region and the second display region are each part of a bendable display of the device that is configured to bend to adjust the position.

6. The method of claim 1, wherein the activating of the interaction mode activates at least one mode I/O feature in the set of mode I/O features.

7. The method of claim 1, further comprising after the managing of the device interfaces, in response to detecting the device is no longer in the physical configuration, disabling at least one mode I/O feature in the set of mode I/O features.

8. The method of claim 1, wherein the activating the interaction mode activates passive listening for speech input on the device.

9. The method of claim 1, wherein the activating the interaction mode activates a personal assistant.

10. The method of claim 1, wherein the interaction mode is a far field interaction mode and the activating of the interaction mode switches the device from a near field interaction mode to the far field interaction mode.

11. One or more computer storage media storing computer-useable instructions that, when executed by one or more processors, cause the one or more processors to perform operations comprising:

detecting a change of a device from a first physical configuration to a second physical configuration based on sensor data from one or more configuration sensors, the second physical configuration comprising a position of a first display region of the device with respect to a second display region of the device, wherein the position is physically adjustable;

selecting a configuration profile from a plurality of configuration profiles based on the detected second physical configuration of the device, each configuration profile being a representation of at least one respective physical configuration of the device;

switching an active interaction mode from an interaction mode corresponding to the first physical configuration to an interaction mode corresponding to the second physical configuration based on the selected configuration profile, each interaction mode comprising a set of mode input/output (I/O) features available while the interaction mode is active;

managing device interfaces including one or more microphones of the device using at least some mode I/O features in the set of mode I/O features based on the activating of the interaction mode, where such managing causes the one or more microphones to operate differently for the first physical configuration of the device relative to the second physical configuration of the device.

12. The one or more computer storage media of claim 11, wherein the detecting of the change is based on detecting an adjustment of an initial position of the device corresponding to the first physical position to the position of the second physical configuration.

13. The one or more computer storage media of claim 11, wherein the switching of the active interaction mode deactivates each mode I/O feature in the interaction mode corresponding to the first physical configuration based on the mode I/O feature not being included in the interaction mode corresponding to the second physical configuration.

14. The one or more computer storage media of claim 11, wherein the first physical configuration corresponds to a first orientation of the device and the second physical configuration corresponds to a second orientation of the device.

15. The one or more computer storage media of claim 11, wherein the switching of the active interaction mode changes one or more privacy settings of a user agent.

16. The one or more computer storage media of claim 11, wherein the sensor data comprises one or more physical measurements made by the one or more configuration sensors.

17. A system comprising:
one or more processors; and
one or more computer storage media storing computer-useable instructions that, when executed by the one or more processors, cause the one or more processors to perform operations comprising:

detecting a physical configuration of a device based on sensor data from one or more configuration sensors of the device, the device being bendable to adjust an angle between a first display region of the device and a second display region of the device, the physical configuration comprising the device being bent such that the angle allows the device to be supported by at least one edge of the device on a support surface, the at least one edge extending along the first display region and the second display region;

selecting a configuration profile from a plurality of configuration profiles based on the detected physical configuration of the device, each configuration profile being a representation of at least one respective physical configuration of the device;

activating an interaction mode corresponding to the selected configuration profile, the interaction mode comprising a set of input/output (I/O) mode features available while the interaction mode is active; and managing device interfaces including one or more microphones of the device using at least some mode I/O features in the set of mode I/O features based on the activating of the interaction mode, where such managing causes the one or more microphones to operate differently for a first physical configuration of the device relative to a second physical configuration of the device.

18. The system of claim 17, wherein the first display region is a first display on a first panel of the device and the second display region is a second display on a second panel of the device.

19. The system of claim 17, wherein the device comprises a hinge coupling a first panel of the device to a second panel of the device, the hinge being adjustable to adjust the angle.

20. The system of claim 17, wherein the physical configuration comprises an orientation of the device with respect to the support surface.

21. The method of claim 1, wherein the device interfaces include two or more microphones, and
wherein the set of I/O features includes, for the first physical configuration of the device, operating the two or more microphones collaboratively, and for the second physical configuration of the device different from the first physical configuration, operating the two or more microphones independently.

* * * * *